US012732833B2

(12) United States Patent
Iwabuchi et al.

(10) Patent No.: US 12,732,833 B2
(45) Date of Patent: Sep. 8, 2026

(54) WIRELESS COMMUNICATION SYSTEM, WIRELESS COMMUNICATION METHOD, WIRELESS COMMUNICATION PROCESSING DEVICE, AND WIRELESS COMMUNICATION PROCESSING PROGRAM

(71) Applicant: NTT, Inc., Tokyo (JP)

(72) Inventors: Masashi Iwabuchi, Musashino (JP); Riku Omiya, Musashino (JP); Tatsuhiko Iwakuni, Musashino (JP); Tomoaki Ogawa, Musashino (JP); Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 271 days.

(21) Appl. No.: 18/717,572

(22) PCT Filed: Dec. 13, 2021

(86) PCT No.: PCT/JP2021/045871
§ 371 (c)(1),
(2) Date: Jun. 7, 2024

(87) PCT Pub. No.: WO2023/112094
PCT Pub. Date: Jun. 22, 2023

(65) Prior Publication Data
US 2025/0039693 A1 Jan. 30, 2025

(51) Int. Cl.
*H04W 24/02* (2009.01)
*H04B 7/04* (2017.01)
(Continued)

(52) U.S. Cl.
CPC .......... *H04W 24/02* (2013.01); *H04B 7/0617* (2013.01); *H04L 5/0051* (2013.01)

(58) Field of Classification Search
CPC . H04W 24/02; H04B 7/0617; H04B 7/04013; H04B 7/15; H04L 5/0051; Y02D 30/70
See application file for complete search history.

(56) References Cited

U.S. PATENT DOCUMENTS 10,972,179 B2 * 4/2021 Menard ............ H04J 14/02122
11,159,313 B2 * 10/2021 Fletcher ................ H04L 9/0847
(Continued)

OTHER PUBLICATIONS

Kwon et al., "Machine Learning-Based Beamforming in K-User MISO Interference Channels", IEEE Access, vol. 9, Feb. 19, 2021, pp. 28066-28075.
(Continued)

*Primary Examiner* — Harry H Kim
(74) *Attorney, Agent, or Firm* — XSENSUS LLP

(57) ABSTRACT

The following processing is performed in the learning phase. The base station device transmits a control signal toward the relay device. The relay device dynamically selects a phase weight that determines the beam direction of the reflected wave according to the set value. A channel state of the CH2 is estimated from a low-frequency CH2 reference signal that has arrived at the base station device from the terminal device. The communication quality of the CH1 is measured from the high-frequency CH1 reference signal that has arrived at the base station device from the terminal device. A learning model is generated by learning the set value, the channel state, and the communication quality. In the estimation phase, the latest channel state acquired by the CH2 is applied to the learning model, and an optimum set value predicted to maximize the communication quality under the latest state is estimated.

19 Claims, 12 Drawing Sheets

(51) Int. Cl.
*H04B 7/06* (2006.01)
*H04B 7/15* (2006.01)
*H04L 5/00* (2006.01)

(56) References Cited

U.S. PATENT DOCUMENTS

| | | | | |
|---|---|---|---|---|
| 2016/0020876 | A1* | 1/2016 | Raghavan | H04L 5/006 370/252 |
| 2019/0109635 | A1* | 4/2019 | Buer | H04B 7/2041 |
| 2019/0313626 | A1* | 10/2019 | Massis | A01M 23/005 |
| 2019/0373608 | A1* | 12/2019 | Weiss | H04W 72/0446 |
| 2020/0052787 | A1* | 2/2020 | Menard | G02B 6/29395 |
| 2020/0169549 | A1* | 5/2020 | Smith | H04L 63/101 |
| 2020/0382901 | A1* | 12/2020 | O'Malley | H04W 4/029 |
| 2021/0091934 | A1* | 3/2021 | Fletcher | H04L 9/0847 |
| 2021/0281334 | A1* | 9/2021 | Li | H04B 17/26 |
| 2024/0276242 | A1* | 8/2024 | Sun | H04L 41/16 |
| 2025/0266864 | A1* | 8/2025 | Ferrante | H04B 7/0617 |

OTHER PUBLICATIONS

Diamantaras et al., "Optimal Mobile Relay Beamforming via Reinforcement Learning", IEEE 29th International Workshop on Machine Learning for Signal Processing, 2019, 6 pages.

* cited by examiner

WIRELESS COMMUNICATION SYSTEM, WIRELESS COMMUNICATION METHOD, WIRELESS COMMUNICATION PROCESSING DEVICE, AND WIRELESS COMMUNICATION PROCESSING PROGRAM

CROSS-REFERENCE TO RELATED APPLICATION

The present application is based on PCT filing PCT/JP2021/045871, filed Dec. 13, 2021, the entire contents of which are incorporated herein by reference.

TECHNICAL FIELD

The present disclosure relates to a wireless communication system, a wireless communication method, a wireless communication processing device, and a wireless communication processing program, and more particularly, to a wireless communication system, a wireless communication method, a wireless communication processing device, and a wireless communication processing program suitable for a case of using a relay capable of dynamically controlling a beam direction.

BACKGROUND ART

Non Patent Literatures 1 and 2 below disclose a wireless communication system that uses a relay device capable of dynamically controlling a beam direction.

FIG. 1 illustrates an example of a conventional wireless communication system that uses a relay device having the function described above. The system illustrated in FIG. 1 includes a base station device 10 for wireless communication. The base station device 10 has a function of transmitting a plurality of beams. Here, it is assumed that the number of transmission beams of the base station device 10 is Ntx.

The system illustrated in FIG. 1 also includes a relay device 12 and a terminal device 14. The number of the relay devices 12 may be one or plural. FIG. 1 illustrates a configuration example including M relay devices 12. The relay device 12 has a function of relaying a radio signal between the base station device 10 and the terminal device 14. Specifically, the relay device 12 is configured with a reflector or a repeater capable of dynamically controlling the beam direction. Moreover, the relay device 12 can generate a plurality of relay beams. Here, it is assumed that the number of relay beams generated by the relay device 12 is Nrelay.

The terminal device 14 can establish wireless communication with the base station device 10 directly or via the relay device 12. The terminal device 14 can generate a plurality of beams. Here, it is assumed that the number of terminal beams emitted by the terminal device 14 is Nrx.

According to the wireless communication system illustrated in FIG. 1, a plurality of wireless propagation paths can be formed between the base station device 10 and the terminal device 14 by using a plurality of relay devices 12. As a result, path diversity, an extension effect of the MIMO multiplexing number, and the like can be obtained, and high communication efficiency can be obtained.

CITATION LIST

Non Patent Literature

[Non Patent Literature 1] H. J. Kwon et al., "Machine Learning-Based Beamforming . . . ", IEEE Access, Vol. 9, pp. 28066-28075 (2021).

[Non Patent Literature 2] K. Diamantaras et al., "Optimal Mobile Relay Beamforming . . . ", 2019 IEEE 29th International Workshop on Machine Learning for Signal Processing (2019). Intelligent Reflecting Surface Enhanced Wireless Network via Joint Active and Passive Beamforming, Qingqing Wu, Rui Zhang, IEEE TRANSACTIONS ON WIRELESS COMMUNICATIONS, p 5394-5409, VOL. 18, NO. 11, November 2019.

SUMMARY OF INVENTION

Technical Problem

By the way, in the above-described conventional wireless communication system, it is necessary to set an appropriate beam direction in the relay device 12 in order to cause the relay device 12 to appropriately relay a signal between the base station device 10 and the terminal device 14. On the other hand, the relay device 12 cannot control the beam direction by itself. For this reason, in the above wireless communication system, it is necessary to search for the direction of the beam for each combination of individual beams and then instruct an optimum beam direction to the relay device 12.

Here, the number of beam searches L required for the system illustrated in FIG. 1 is large as expressed by the following equation.

$$L = (\text{the number of transmission beams } Ntx) * (\text{the number of relay beams } Nrelay) * (\text{the number of relay devices } M) * (\text{the number of terminal beams } Nrx)$$

For this reason, the wireless communication system illustrated in FIG. 1 has a problem that the overhead for the search regarding the combination of beams including the relay device 12 becomes large.

The present disclosure has been made in view of the above problems, and a first object of the present disclosure is to provide a wireless communication system capable of sufficiently reducing the overhead required for beam selection in a relay device while using the relay device capable of dynamically controlling the beam direction.

Moreover, a second object of the present disclosure is to provide a wireless communication method capable of sufficiently reducing the overhead required for beam selection in a relay device while using the relay device capable of dynamically controlling the beam direction.

Moreover, a third object of the present disclosure is to provide a wireless communication processing device capable of sufficiently reducing the overhead required for beam selection in a relay device while using the relay device capable of dynamically controlling the beam direction.

Furthermore, a fourth object of the present disclosure is to provide a wireless communication processing program for sufficiently reducing the overhead required for beam selection in a relay device while using the relay device capable of dynamically controlling the beam direction.

Solution to Problem

In order to achieve the above objects, it is preferable that a first aspect is a wireless communication system including a base station device, a relay device, and a terminal device, in which the base station device is configured to provide the relay device with a control signal including a set value, the relay device is configured to dynamically select a phase weight that determines a beam direction of a reflected wave according to the set value, the terminal device is configured to transmit a reference signal having a low frequency and a reference signal having a high frequency, and the wireless communication system further includes a processing device configured to execute, in a learning phase:

a process of causing the base station device to transmit the control signal toward the relay device;

a process of estimating, from the reference signal having the low frequency that has arrived at the base station device, a state of a channel that transmits a signal having the low frequency;

a process of measuring, from the reference signal having the high frequency that has arrived at the base station device, communication quality at the high frequency;

a process of storing a data set including a set value included in the control signal, the state of the channel, and the communication quality in a database unit; and a process of learning a learning model that defines a relationship among the set value, the state of the channel, and the communication quality on the basis of a plurality of the data sets, and to execute, in an estimation phase:

a process of estimating the latest state of the channel from the reference signal having the low frequency that has arrived at the base station device;

a process of applying the latest state to the learning model and estimating an optimum set value predicted to maximize the communication quality under the latest state; and a process of causing the base station device to transmit a control signal including the optimum set value.

Moreover, it is preferable that a second aspect is a wireless communication method for realizing wireless communication that uses a base station device, a relay device, and a terminal device, the wireless communication method including:

a step of providing, by the base station device, the relay device with a control signal including a set value;

a step of dynamically selecting, by the relay device, a phase weight that determines a beam direction of a reflected wave according to the set value; and a step of transmitting, by the terminal device, a reference signal having a low frequency and a reference signal having a high frequency, the wireless communication method further including, in a learning phase:

a step of causing the base station device to transmit the control signal toward the relay device;

a step of estimating, from the reference signal having the low frequency that has arrived at the base station device, a state of a channel that transmits a signal having the low frequency;

a step of measuring, from the reference signal having the high frequency that has arrived at the base station device, communication quality at the high frequency;

a step of storing a data set including a set value included in the control signal, the state of the channel, and the communication quality in a database unit; and a step of learning a learning model that defines a relationship among the set value, the state of the channel, and the communication quality on the basis of a plurality of the data sets, the wireless communication method further including, in an estimation phase:

a step of estimating the latest state of the channel from the reference signal having the low frequency that has arrived at the base station device;

a step of applying the latest state to the learning model and estimating an optimum set value predicted to maximize the communication quality under the latest state; and a step of causing the base station device to transmit a control signal including the optimum set value.

Moreover, it is preferable that a third aspect is a wireless communication processing device for realizing wireless communication using a base station device configured to transmit a control signal including a set value, a relay device configured to receive the control signal and dynamically select a phase weight that determines a beam direction of a reflected wave according to the set value, and a terminal device configured to transmit a reference signal having a low frequency and a reference signal having a high frequency, the wireless communication processing device being configured to execute, in a learning phase:

a process of causing the base station device to transmit the control signal toward the relay device;

a process of estimating, from the reference signal having the low frequency that has arrived at the base station device, a state of a channel that transmits a signal having the low frequency;

a process of measuring, from the reference signal having the high frequency that has arrived at the base station device, communication quality at the high frequency;

a process of storing a data set including a set value included in the control signal, the state of the channel, and the communication quality in a database unit; and a process of learning a learning model that defines a relationship among the set value, the state of the channel, and the communication quality on the basis of a plurality of the data sets, and to execute, in an estimation phase:

a process of estimating the latest state of the channel from the reference signal having the low frequency that has arrived at the base station device;

a process of applying the latest state to the learning model and estimating an optimum set value predicted to maximize the communication quality under the latest state; and a process of causing the base station device to transmit a control signal including the optimum set value.

Moreover, it is preferable that a fourth aspect is a wireless communication processing program for realizing wireless communication using a base station device configured to transmit a control signal including a set value, a relay device configured to receive the control signal and dynamically select a phase weight that determines a beam direction of a reflected wave according to the set value, and a terminal device configured to transmit a reference signal having a low frequency and a reference signal having a high frequency, the wireless communication processing program being capable of causing an arithmetic processing unit to execute, in a learning phase:

a process of causing the base station device to transmit the control signal toward the relay device;

a process of estimating, from the reference signal having the low frequency that has arrived at the base station device, a state of a channel that transmits a signal having the low frequency;

a process of measuring, from the reference signal having the high frequency that has arrived at the base station device, communication quality at the high frequency;

a process of storing a data set including a set value included in the control signal, the state of the channel, and the communication quality in a database unit; and a process of learning a learning model that defines a relationship among the set value, the state of the channel, and the communication quality on the basis of a plurality of the data sets, and to execute, in an estimation phase:

a process of estimating the latest state of the channel from the reference signal having the low frequency that has arrived at the base station device;

a process of applying the latest state to the learning model and estimating an optimum set value predicted to maximize the communication quality under the latest state; and a process of causing the base station device to transmit a control signal including the optimum set value.

Advantageous Effects of Invention

According to the first to fourth aspects, it is possible to sufficiently reduce the overhead required for beam selection in a relay device while using the relay device capable of dynamically controlling the beam direction.

DESCRIPTION OF EMBODIMENTS

First Embodiment

Characteristics of First Embodiment

Figure 1:
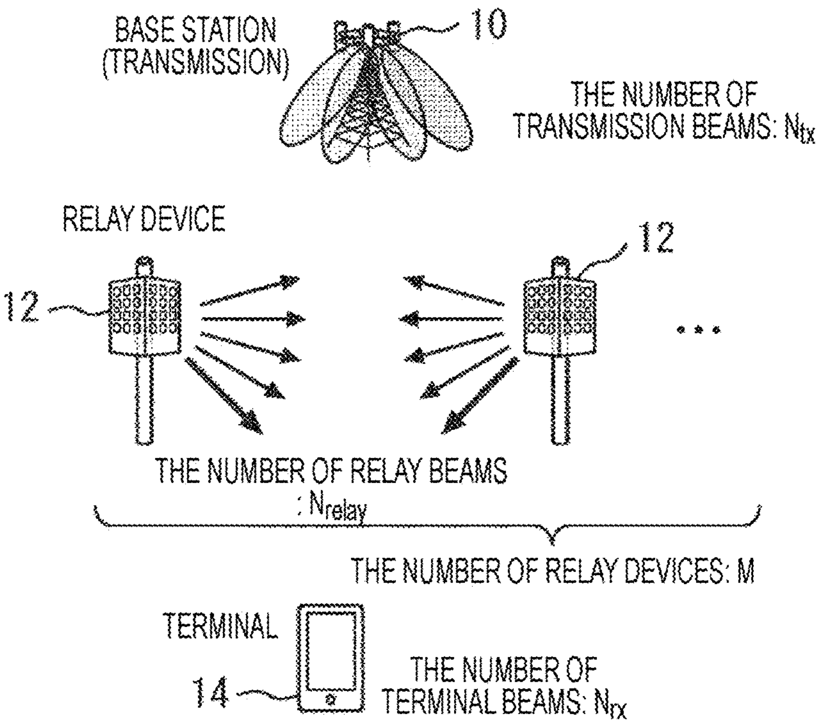
FIG. 1 is a diagram for explaining a configuration of a conventional wireless communication system that uses a relay device.
Figure 2:
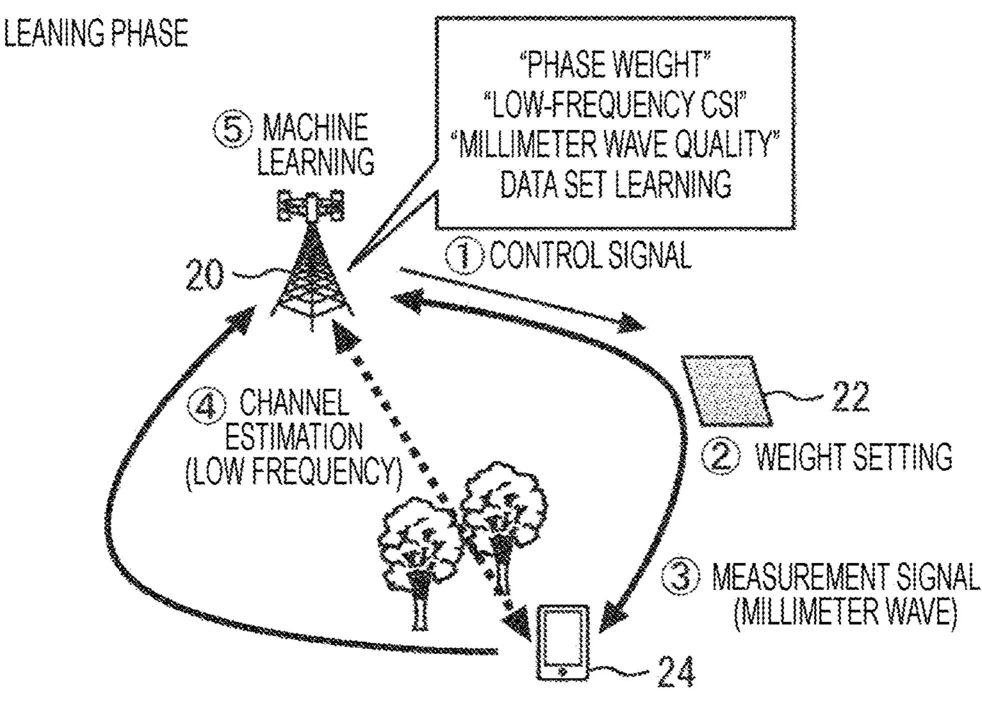
FIG. 2 is a diagram for explaining an outline of a learning phase in a first embodiment of the present disclosure.

FIG. 2 is a diagram for explaining an operation of a learning phase that is a first feature of the first embodiment of the present disclosure. A wireless communication system according to the present embodiment includes a base station device 20, a relay device 22, and a terminal device 24.

In the learning phase, the following processing is executed in order to learn the relationship between a wireless propagation path between the base station device 20 and the terminal device 24, and the phase weight used in the relay device 22.

(1) The base station device 20 transmits a control signal to the relay device 22.

(2) The relay device 22 receives the control signal and sets a phase weight that determines the reflection direction of the beam.

(3) The terminal device 24 outputs a high-frequency millimeter wave signal as a measurement signal. The measurement signal arrives at the base station device 20 via the relay device 22. The base station device 20 detects the communication quality in a high frequency band on the basis of the received measurement signal. Hereinafter, the result of such detection will be referred to as "millimeter wave quality".

(4) The terminal device 24 further transmits channel state information (CSI) on a low-frequency signal in order to estimate the state of a channel. The CSI includes information indicating the state of a channel constituting a wireless propagation path, such as scattering, decay, and output attenuation. The CSI is received by the base station device 20 as illustrated in the drawing.

(5) The base station device 20 stores three of the "phase weight" set by the relay device 22, the "low-frequency CSI" received from the terminal device 24, and the "millimeter wave quality" received via the relay device 22 as data set, and performs machine learning processing. As a result, what kind of "millimeter wave quality" is obtained by setting what kind of "phase weight" under what kind of "low-frequency CSI" is learned.

Figure 3:
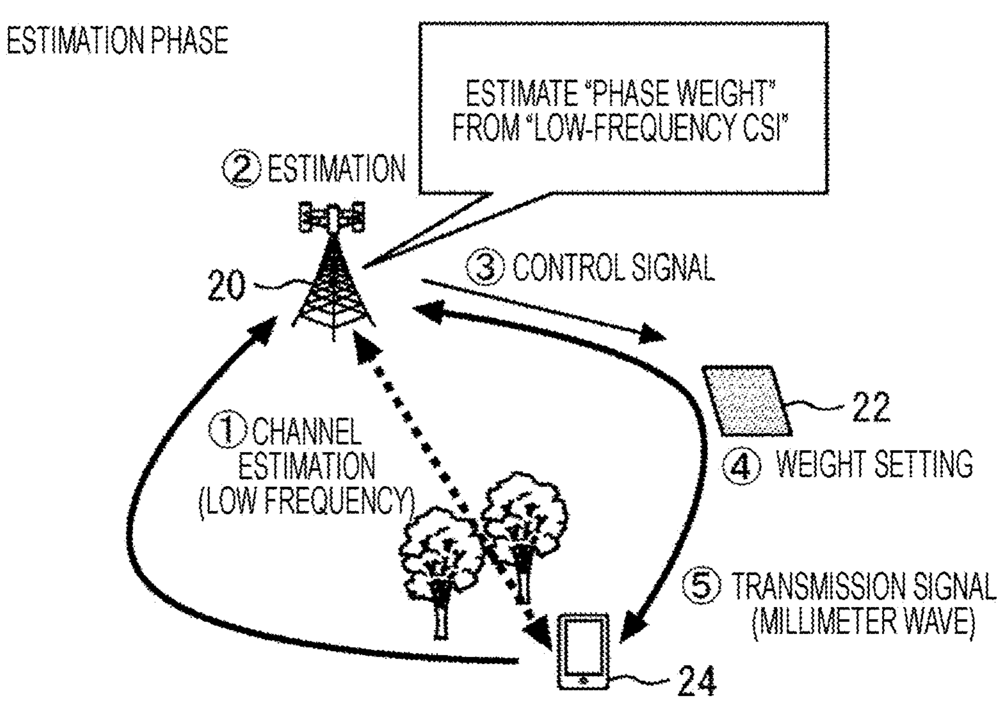
FIG. 3 is a diagram for explaining an outline of an estimation phase in the first embodiment of the present disclosure.

FIG. 3 is a diagram for explaining an operation of an estimation phase that is a second feature of the first embodiment of the present disclosure. In the estimation phase, the following processing is executed to estimate the phase weight that realizes the best communication quality on the basis of the learning model learned in the learning phase.

(1) The terminal device 24 transmits low-frequency CSI. The low-frequency CSI includes information indicating the latest state of the wireless propagation path and is received by the base station device 20.

(2) In the base station device 20, the state of the channel indicated by the low-frequency CSI is applied to the above learning model, and the phase weight that realizes the optimum communication quality under the current state is estimated.

(3) The base station device 20 transmits a control signal to the relay device 22 in order to transmit the estimated phase weight.

(4) The relay device 22 sets a phase weight designated by the control signal. As a result, the beam of the relay device 22 is directed in a direction in which efficient relay is realized.

(5) Thereafter, transmission signals of high-frequency millimeter waves are exchanged between the base station device 20 and the terminal device 24.

As described above, in a wireless communication system according to the present embodiment, the beam setting of the relay device 22 can be performed remotely from the base station device 20. Moreover, by using a learning model generated in advance, it is possible to easily determine the optimum phase weight without incurring a large search load. Therefore, according to this system, optimum beam setting can be realized without causing excessive search overhead even when the number of transmission beams Ntx, the number of relay beams Nrelay, the number of relay devices M, and the number of terminal beams Nrx are large.

Configuration of First Embodiment

Figure 4:
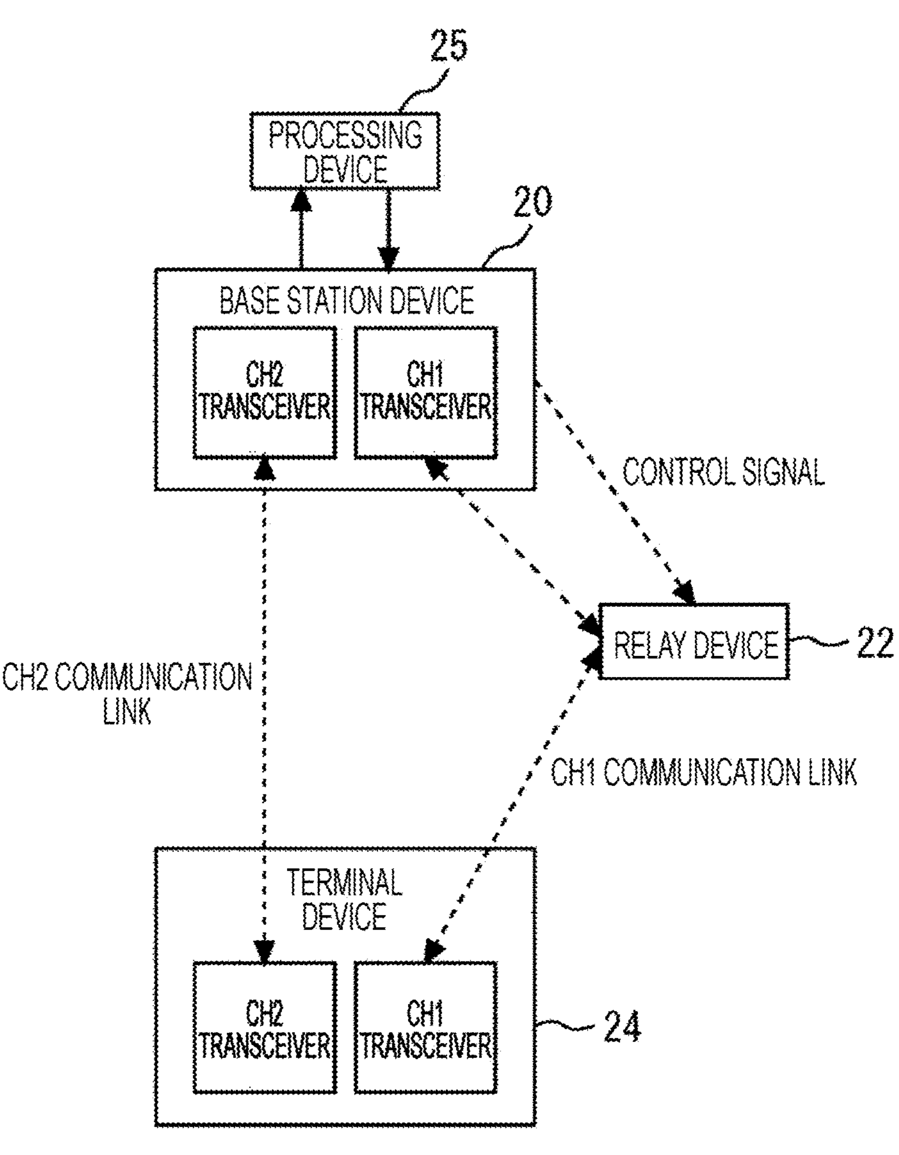
FIG. 4 is a block diagram for explaining a configuration of a wireless communication system according to the first embodiment of the present disclosure.

FIG. 4 is a block diagram for explaining an overall configuration of a wireless communication system according to the present embodiment. The system according to the present embodiment includes a processing device 25 in addition to the base station device 20, the relay device 22, and the terminal device 24. The number of the base station devices 20 is not limited to one, and may be plural. Similarly, the relay devices 22 and the terminal devices 24 may also be plural, respectively.

The processing device 25 has a function of collecting, accumulating, and processing information received and demodulated by the base station device 20. The above-described learning of a data set and estimation processing using a learning model are executed in the processing device 25.

Each of the base station device 20 and the terminal device 24 has a function of transmitting and receiving signals in two or more different frequency bands. In the example illustrated in FIG. 4, the base station device 20 and the terminal device 24 each include a transceiver for a channel 1 (CH1) and a transceiver for a channel 2 (CH2). In the present embodiment, it is assumed that data communication in a high frequency band, that is, a millimeter wave is performed by the CH1, and communication in a low frequency band is performed by the CH2.

However, the combination of a CH and a frequency band is not limited thereto, and the CH1 may be used for communication in a low frequency band and the CH2 may be used for communication in a high frequency band. Moreover, frequency bands used for communication are not limited to those exemplified in the present embodiment. Furthermore, the frequency band may be a licensed band or an unlicensed band.

The relay device 22 is disposed to relay a transmission signal from the base station device 20 or the terminal device 24 to the other. By using the relay device 22, it is possible to avoid a shield existing between the base station device 20 and the terminal device 24. Moreover, a spatial multiplexing effect due to an increase in propagation paths can be obtained. The relay device 22 includes a communicator for receiving a control signal. As a result, the relay device 22 can be controlled and managed remotely.

A control signal is transmitted from, for example, the base station device 20. Although FIG. 4 illustrates an example in which the base station device 20 that communicates with the terminal device 24 transmits the control signal, the control signal may be transmitted from another base station device to the relay device 23. The line to be used for notification of the control signal may be wired or wireless, and the notification method is not limited. A similar process can also be performed in a case where there is a plurality of relay devices 22.

Figure 5:
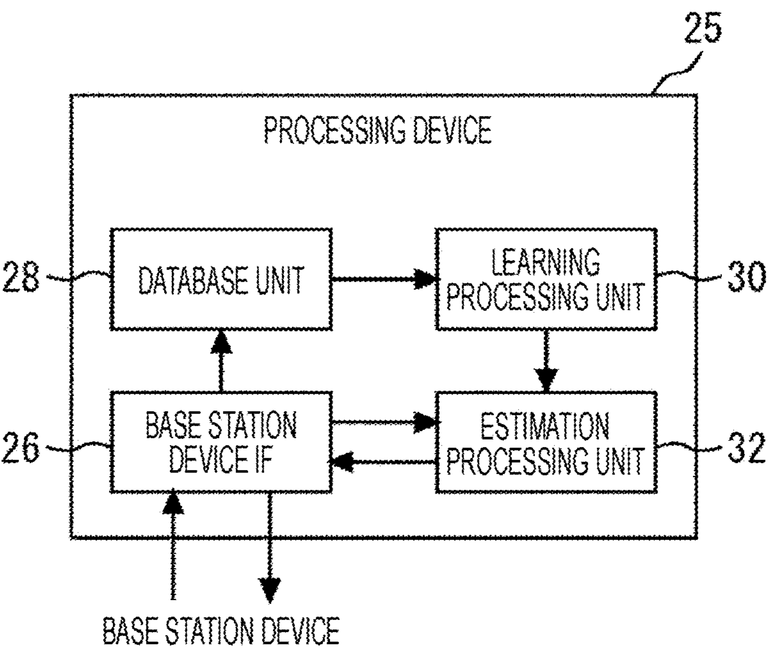
FIG. 5 is a block diagram for explaining a configuration of a processing device included in the wireless communication system according to the first embodiment of the present disclosure.

FIG. 5 is a block diagram for functionally explaining the configuration of the processing device 25. The processing device 25 includes an arithmetic processing unit and a memory in addition to dedicated hardware. Specifically, the functions of the units illustrated in FIG. 5 are implemented by the arithmetic processing unit performing processing according to a program stored in the memory in cooperation with dedicated hardware.

The processing device 25 includes a base station device IF 26. The base station device IF 26 is an interface for receiving information transferred from the base station device 20 and transmitting a notification from the processing device 25 to the base station device 20. The information received by the base station device IF 26 includes the information regarding the millimeter wave quality obtained at the CH1 and the low-frequency CSI obtained at the CH2, that is, the channel information of the wireless propagation path.

The processing device 25 includes a database unit 28. The database unit 28 stores the information transferred from the base station device 20 and the set value of the phase weight provided to the relay device 22 as a data set. Specifically, the processing device 25 stores the information on the millimeter wave quality of the CH1 and the channel information of the CH2 emitted from the terminal device 24 in the database unit 28 in association with the set value in a period from notification of the set value related to the phase weight to the relay device 22 until updating of the set value. When learning of all or a large number of set values that can be adopted by the relay device 22 is completed, the processing device 25 gets into a state of being able to select a set value that maximizes the communication quality of the CH1.

The processing device 25 further includes a learning processing unit 30 and an estimation processing unit 32. The learning processing unit 30 calculates a learning model using a large number of data sets stored in the database unit 28. On the other hand, the estimation processing unit 32 applies the channel information acquired via the base station device IF 26 to the learning model generated by the learning processing unit 30 so as to estimate a set value to be set in the relay device 22 in order to obtain the best millimeter wave quality. The set value may be directly estimated by the estimation processing unit 32 from the channel information. Alternatively, the estimation processing unit 32 may estimate the communication quality of the CH1 corresponding to the provisional set value from the channel information, and select a set value at which the best estimated quality of the CH1 is obtained.

Figure 6:
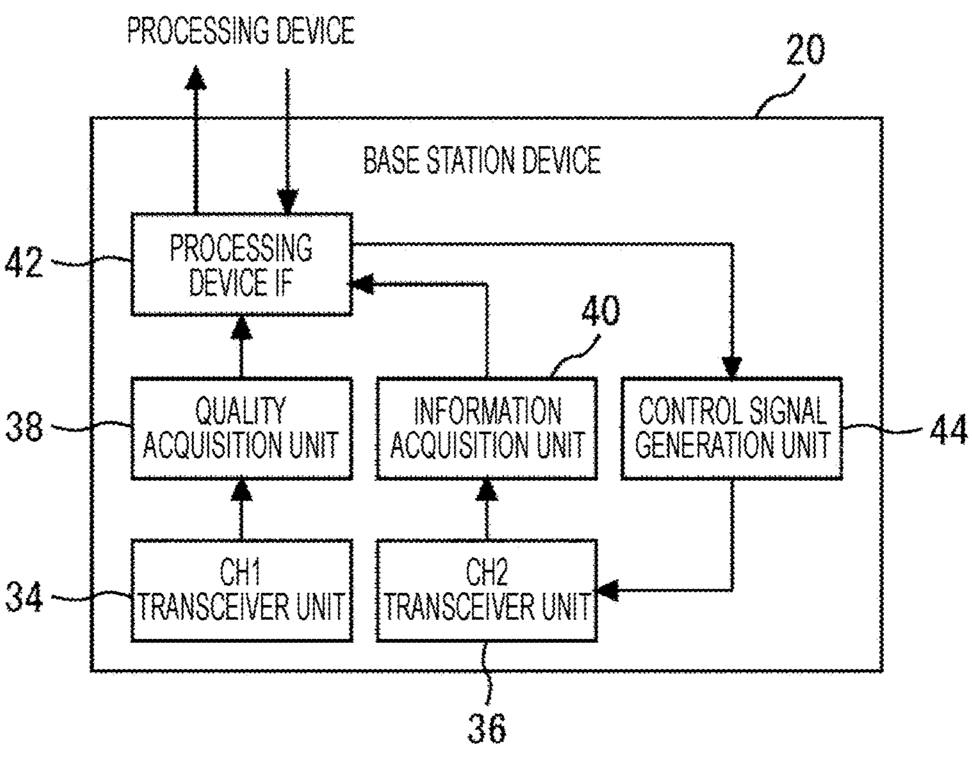
FIG. 6 is a block diagram for explaining a configuration of a base station device included in the wireless communication system according to the first embodiment of the present disclosure.

FIG. 6 is a block diagram for functionally explaining a configuration of the base station device 20. The base station device 20 also includes an arithmetic processing unit and a memory in addition to dedicated hardware. Specifically, the functions of the units illustrated in FIG. 6 are implemented by the arithmetic processing unit performing processing according to a program stored in the memory in cooperation with dedicated hardware.

The base station device 20 includes a CH1 transceiver unit 34 and a CH2 transceiver unit 36. The CH1 transceiver unit 34 has a function for performing wireless communication in a high frequency band. On the other hand, the CH2 transceiver unit 36 has a function for performing wireless communication in a low frequency band.

The base station device 20 includes a quality acquisition unit 38 and an information acquisition unit 40. The quality acquisition unit 38 measures an index related to the communication quality of the CH1 on the basis of a measurement signal transmitted on the CH1. Specifically, the received signal strength indicator (RSSI), the reference signal received quality (RSRQ), the reference signal received power (RSRP), the signal-to-interference-plus-noise ratio (SINR), the throughput, the received power, the delay time, and the like are measured. On the other hand, the information acquisition unit 40 acquires the channel information of the CH2 by channel estimation using the low-frequency CSI transmitted on the CH2.

The base station device 20 also includes a processing device IF 42. The processing device IF 42 is an interface for transferring information acquired by the base station device 20 to the processing device 25 and receiving information, notification of which is provided from the processing device 25.

The base station device 20 further includes a control signal generation unit 44. The control signal generation unit 44 has a function of generating a control signal, notification of which is provided to the relay device 22, on the basis of the information, notification of which is provided from the processing device 25. The control signal includes information of a phase weight to be set in the relay device 22.

Figure 7:
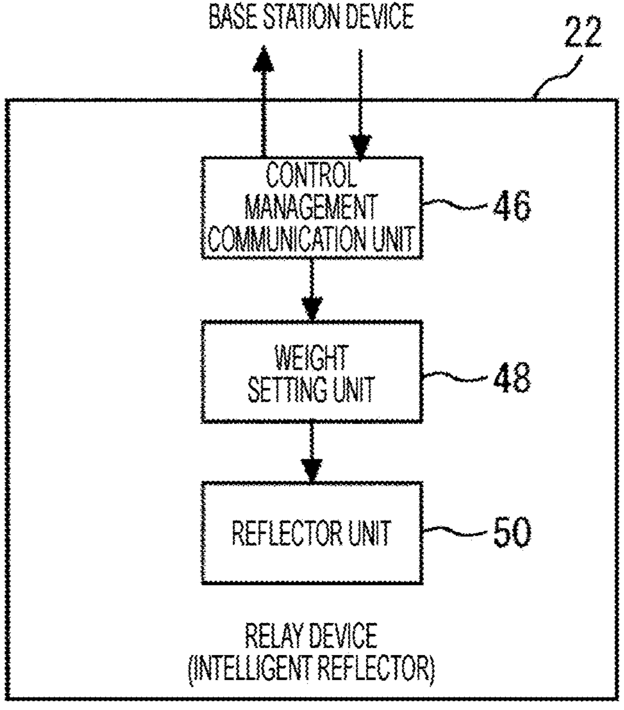
FIG. 7 is a block diagram for explaining a configuration of a relay device included in the wireless communication system according to the first embodiment of the present disclosure.

FIG. 7 is a block diagram for functionally explaining the configuration of the relay device 22. The relay device 22 also includes an arithmetic processing unit and a memory in addition to dedicated hardware. Specifically, the functions of the units illustrated in FIG. 7 are implemented by the arithmetic processing unit performing processing according to a program stored in the memory in cooperation with dedicated hardware.

Specifically, FIG. 7 illustrates a structure of the relay device 22 configured with an intelligent reflector. The relay device 22 illustrated in FIG. 7 includes a control management communication unit 46. The control management communication unit 46 receives a control signal transmitted from the base station device 20 and acquires a set value included in the control signal.

The relay device 22 also includes a weight setting unit 48 and a reflector unit 50. The weight setting unit 48 determines a phase weight to be provided to the reflector unit 50 on the basis of the set value acquired by the control management communication unit 46. For example, in a case where a reflection angle to be realized by the relay device 22 is designated as the set value, the phase weight is determined such that the millimeter wave signal of the CH1 is reflected at the designated angle.

The reflector unit 50 includes a plurality of reflector elements. Each of the reflector elements reflects a high-frequency radio wave arriving through the CH1 in an intended direction, and thus shifts the phase of the reflected radio wave. Then, the reflector unit 50 can dynamically and arbitrarily control the reflection direction of the radio wave by setting a phase shift amount different for each reflector element as the phase weight.

Figure 8:
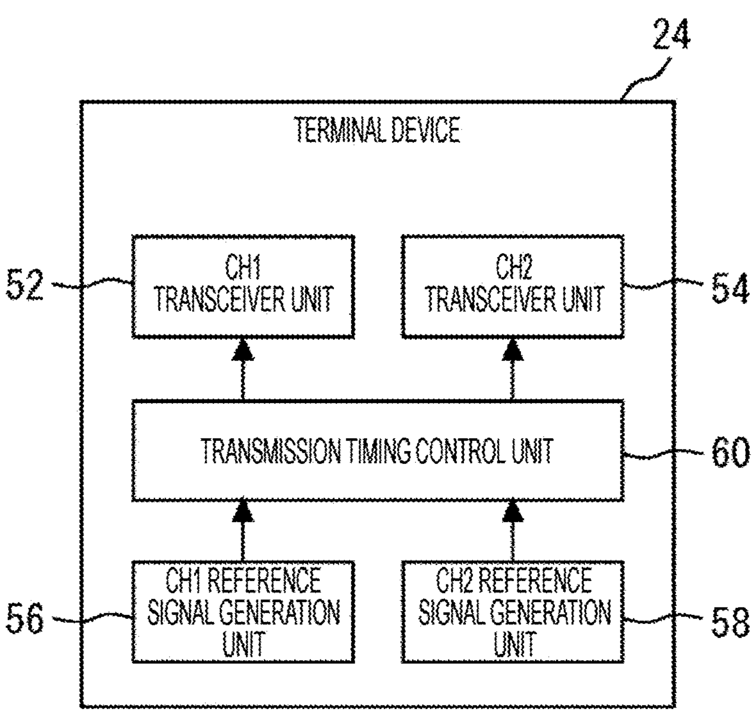
FIG. 8 is a block diagram for explaining a configuration of a terminal device included in the wireless communication system according to the first embodiment of the present disclosure.

FIG. 8 is a block diagram for functionally explaining the configuration of the terminal device 24. The terminal device 24 also includes an arithmetic processing unit and a memory in addition to dedicated hardware. Specifically, the functions of the units illustrated in FIG. 8 are implemented by the arithmetic processing unit performing processing according to a program stored in the memory in cooperation with dedicated hardware.

The terminal device 24 includes a CH1 transceiver unit 52 and a CH2 transceiver unit 54. The CH1 transceiver unit 52 has a function for performing wireless communication in a high frequency band. On the other hand, the CH2 transceiver unit 54 has a function for performing wireless communication in a low frequency band.

The terminal device 24 also includes a CH1 reference signal generation unit 56 and a CH2 reference signal generation unit 58. The CH1 reference signal generation unit 56 generates a reference signal for measuring the radio quality of the CH1, that is, a signal indicated as a "MEASUREMENT SIGNAL (MILLIMETER WAVE)" in FIGS. 2 and 3. On the other hand, the CH2 reference signal generation unit 58 generates a reference signal for performing channel estimation of the CH2, that is, a signal indicated as "CHANNEL ESTIMATION (LOW FREQUENCY)" in FIG. 2 or 3.

Reference signals generated by the CH1 reference signal generation unit 56 or the CH2 reference signal generation unit 58 are transmitted from the CH1 transceiver unit 52 or the CH2 transceiver unit 54 via a transmission timing control unit 60. The transmission timing control unit 60 has a function of adjusting the transmission timing of the reference signals. Specifically, the transmission timing control unit 60 adjusts the transmission timing of the reference signals in a manner such that the measurement of the CH1 and the CH2 can be executed simultaneously or within a certain time error range.

Flow of Processing in First Embodiment

Figure 9:
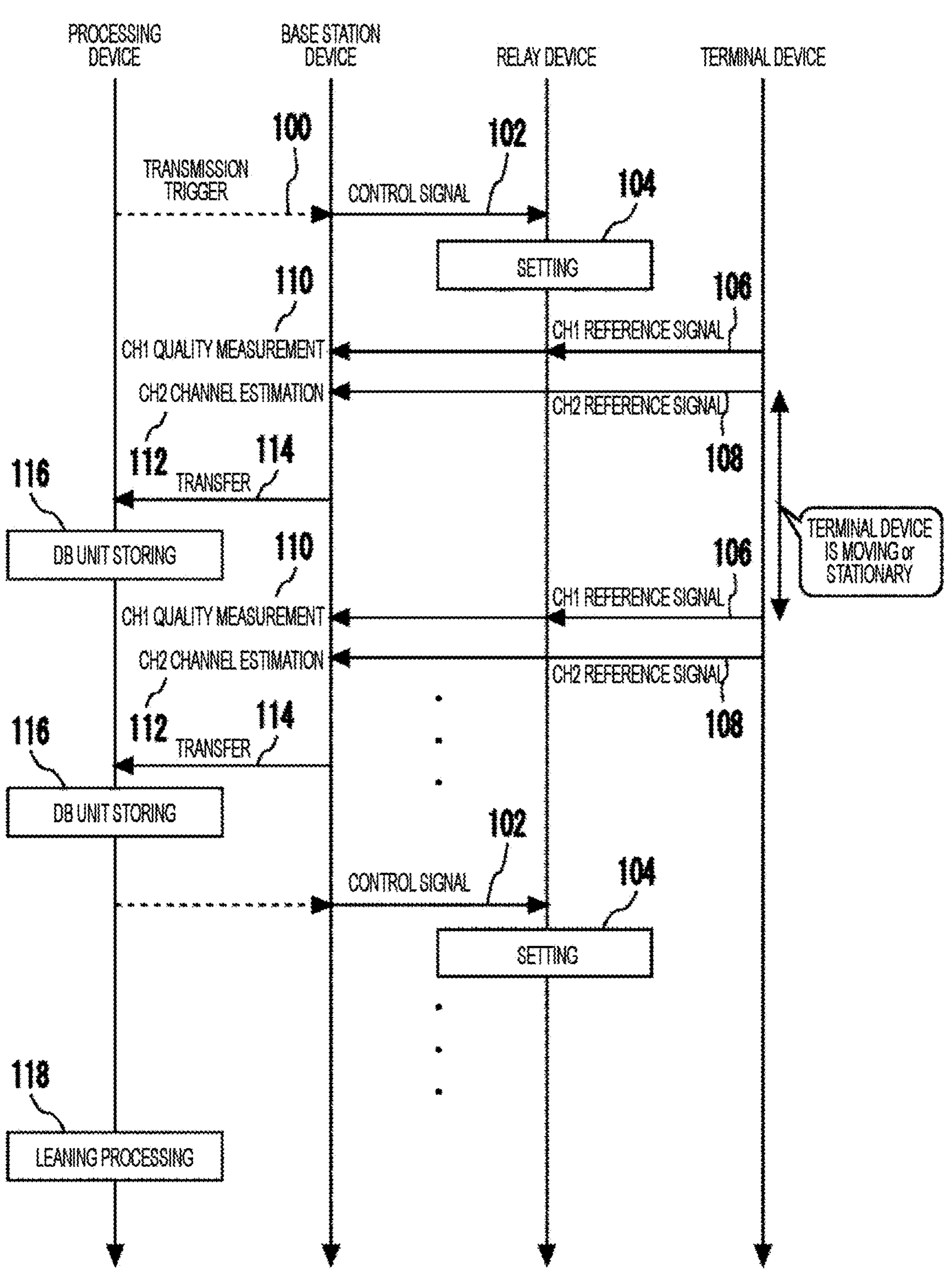
FIG. 9 is a flowchart for explaining an operation of the learning phase in the first embodiment of the present disclosure.

FIG. 9 is a flowchart for explaining a flow of processing executed in the learning phase in the wireless communication system according to the present embodiment. Here, a transmission trigger is first transmitted from the processing device 25 (100). Note that the transmission trigger may be generated not by the processing device 25 but by the base station device 20.

Upon receiving the transmission trigger, the base station device 20 transmits a control signal to the relay device 22 (step 102). The relay device 22 sets a relay parameter such as a phase weight, a beam weight, or a beam angle on the basis of information included in the control signal (step 104).

The terminal device 24 transmits the reference signal of the CH1 and the reference signal of the CH2 (steps 106 and 108). The reference signals are transmitted simultaneously or within an allowable time error range. The transmission trigger of the reference signal may be provided to the terminal device 24 via the relay device 22, or may be periodically generated by the terminal device 24 itself.

The base station device 20 receives the reference signal of the CH1 and measures the communication quality of the CH1 measured with the signal (step 110). Specifically, the RSSI, the RSRQ, the RSRP, the SINR, the throughput, the received power, the delay time, and the like are measured as described above. Moreover, the base station device 20 receives the reference signal of the CH2, and performs channel estimation regarding the CH2 on the basis of the signal (step 112). Then, the result of the quality measurement of the CH1 and the result of the channel estimation of the CH2 are transferred to the processing device 25 (step 114). Note that processing by calculation processing may be added to the results of the quality measurement and the channel estimation before transfer.

The processing device 25 stores the information transferred from the base station device 20 and the set value provided to the relay device 22 on the control signal in the database unit 28 as one data set (step 116). Thereafter, the processing of steps 106 to 116 described above is repeated for a certain period. The certain period is set to a time at which a predetermined number of data sets are obtained for one set value. During this time, the terminal device 24 may be stationary or moving.

When the certain period elapses, that is, when a predetermined number of data sets are acquired for one set value, a new control signal is provided to the relay device 22, and the set value is updated. By repeating such processing, information on the relationship among the communication quality of the CH1, the channel state of the CH2, and the set value of the relay device is collected.

When information can be collected for a large number or all of set values adoptable in the relay device 22, learning processing is performed (step 118). The learning processing is performed in the processing device 25. By the learning processing in this step, a learning model in which the state of the CH2, the set value of the relay device 22, and the communication quality of the CH1 are associated with each other is obtained.

By the way, in the present embodiment, CSI regarding the CH2 may be acquired from a reference signal of the CH2, and an arrival direction of the reference signal viewed from the base station device 20 may be estimated from the CSI. Then, in a case where the arrival direction of the reference signal is estimated, the learning model may be created using the arrival direction as a main factor representing the state of the CH2.

Figure 10:
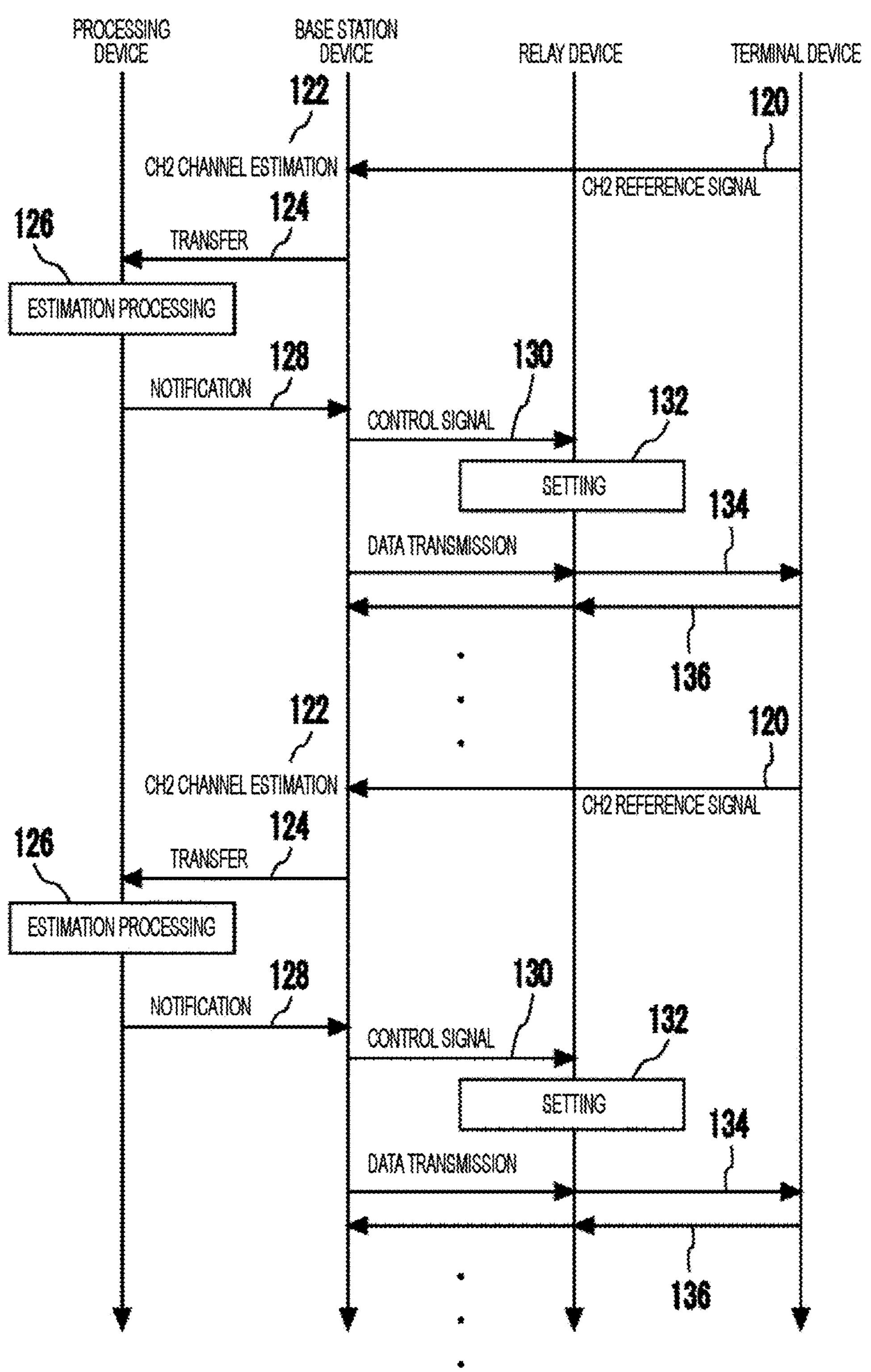
FIG. 10 is a flowchart for explaining an operation of the estimation phase in the first embodiment of the present disclosure.

FIG. 10 is a flowchart for explaining a flow of processing executed in the estimation phase in the wireless communication system according to the present embodiment. The estimation phase is started after the end of the learning phase. The processing of the estimation phase is started when a reference signal of the CH2 is transmitted from the terminal device 24 (step 120).

Upon receiving the reference signal of the CH2, the base station device 20 executes channel estimation of the CH2 using the signal (step 122). Next, the estimated result is transferred to the processing device 25 (step 124).

The processing device 25 applies the result of the channel estimation to the learning model obtained by the learning processing, and estimates the set value to be set in the relay device 22 (step 126). Notification of the result of the estimation processing is provided to the base station device 20 (step 128). Then, the base station device 20 adds the notification information to the control signal and transmits the control signal to the relay device (step 130).

The relay device 22 changes the set value for determining the direction of the beam on the basis of the information added to the control signal (step 132). Thereafter, data is transmitted and received between the base station device 20 and the terminal device 24 (steps 134 and 136).

FIG. 10 illustrates a state in which the terminal device 24 periodically generates the reference signal of the CH2, so that the set value of the relay device 22 is periodically updated. By repeating such processing, according to the wireless communication system of the present embodiment, the setting of the relay device 22 can follow the environmental change of the wireless propagation path. Therefore, according to the wireless communication system of the present embodiment, efficient wireless communication can be maintained for a long period of time.

As described above, according to the wireless communication system of the present embodiment, it is possible to instruct an optimum set value to the relay device 22 without requiring a large search load in the estimation phase by using a learning model learned in the learning phase. Therefore, according to the wireless communication system of the present embodiment, it is possible to sufficiently reduce the overhead required for beam selection in the relay device 22 while using the relay device 22 capable of dynamically controlling the beam direction.

Variation of First Embodiment

In the first embodiment described above, the learning phase and the estimation phase are performed separately and independently. However, the present disclosure is not limited thereto. For example, in the estimation phase, the reference signal of the CH1 may be transmitted to the terminal device 24 together with the reference signal of the CH2, and the information collection may be performed similarly to the learning phase.

Moreover, the learning phase and the estimation phase are not necessarily performed in series, and may be executed in parallel. If they are executed in parallel, it is possible to estimate the optimum beam setting while updating the learning model in real time.

Moreover, in the first embodiment described above, the intelligent reflector is used as the relay device 22. However, the present disclosure is not limited thereto, and a smart repeater may be used as the relay device 22.

Figure 11:
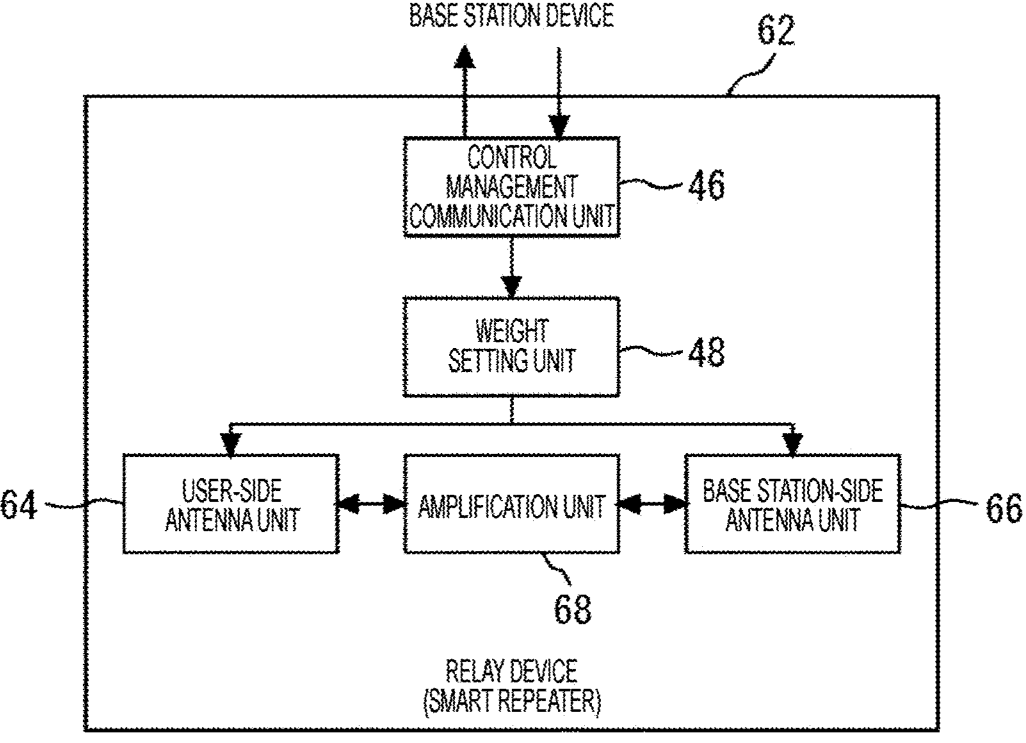
FIG. 11 is a block diagram for explaining a configuration of a second example of a relay device that can be used in the first embodiment of the present disclosure.

FIG. 11 illustrates a configuration of a relay device 62 configured with a smart repeater that can be used in the present embodiment. Note that, in FIG. 11, blocks similar to those illustrated in FIG. 7 are denoted by the same reference numerals, and the description thereof will be omitted or simplified.

As illustrated in FIG. 11, the relay device 62 configured with the smart repeater includes a user-side antenna unit 64. The user-side antenna unit 64 is an antenna unit for communicating with a user, that is, with the terminal device 24. The user-side antenna unit 64 includes a plurality of antenna elements and can form beamforming. Each of the antenna elements is connected with a variable phase shifter. The direction of the beam formed by the relay device 62 can be dynamically controlled by controlling the phase amount (phase weight) adapted to each element by the variable phase shifter.

The relay device 62 includes a base station-side antenna unit 66. The base station-side antenna unit 66 is an antenna unit for communicating with the base station device 20. The base station-side antenna unit 66 can also perform beamforming similarly to the user-side antenna unit.

The relay device 62 further includes an amplification unit 68. The amplification unit 68 has a function of amplifying signal power received by the user-side antenna unit 64 or the base station-side antenna unit 66. The amplification unit 68 may have a function of performing frequency conversion on the reception signals. Moreover, in order to support transmission by time division duplex (TDD), amplifiers corresponding to upper and lower link directions may be provided in the amplification unit 68. In this case, upper and lower link timings may be separately acquired via the control management communication unit 46, and two amplifiers may be switched in accordance with the timing.

According to the relay device 62 having the above-described function, it is possible to dynamically control the direction of the beam on the basis of the control signal provided from the base station device 20 and appropriately relay the radio signal between the base station device 20 and the terminal device 24. Therefore, even if the relay device 22 illustrated in FIG. 7 is replaced with the relay device 62 illustrated in FIG. 11, the above-described excellent effects can be similarly obtained.

Second Embodiment

Figure 12:
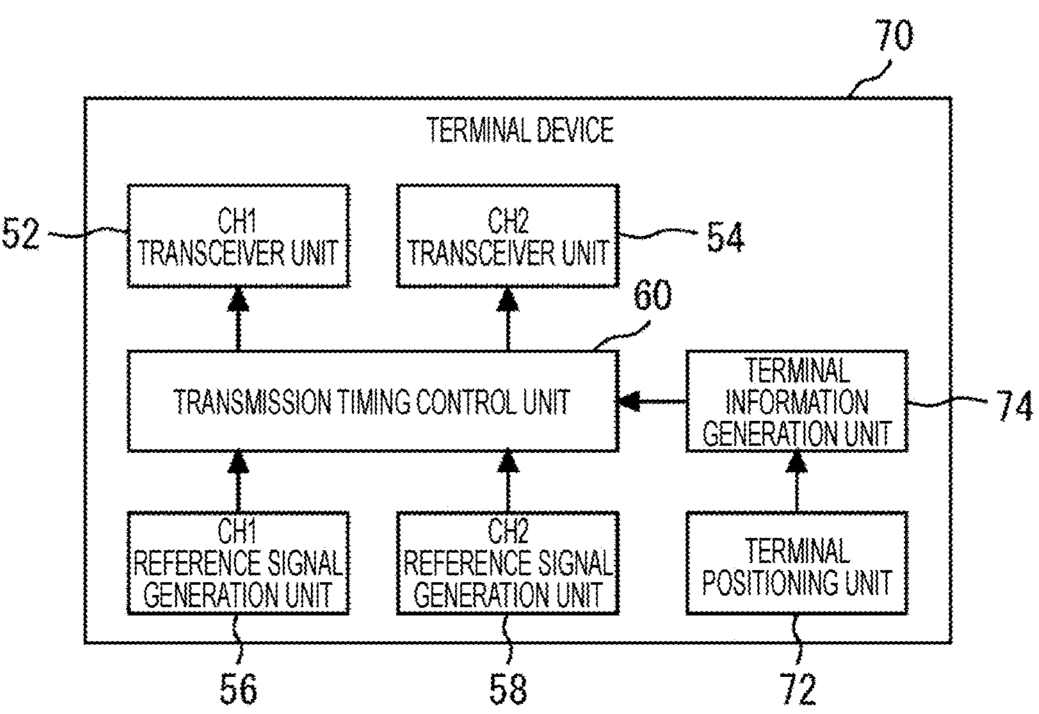
FIG. 12 is a block diagram for explaining a configuration of a second example of a terminal device that can be used in the first embodiment of the present disclosure.

FIG. 12 is a block diagram for functionally explaining a configuration of a terminal device 70 used in the second embodiment of the present disclosure. The wireless communication system according to the present embodiment can be realized by a hardware configuration substantially similar to that of the first embodiment except that the terminal device 24 described with reference to FIG. 8 is replaced with the terminal device 70 illustrated in FIG. 12. Note that, in FIG. 12, description of those corresponding to the blocks illustrated in FIG. 8 will be omitted or simplified.

The terminal device 70 used in the present embodiment includes a terminal positioning unit 72. The terminal positioning unit 72 has a function of estimating the position of the terminal device 70. The position of the terminal device 70 is estimated by, for example, positioning by a global navigation satellite system (GNSS), indoor positioning, self-position estimation, or the like.

The terminal device 70 further includes a terminal information generation unit 74. The terminal information generation unit 74 has a function of generating terminal positional information acquired by the terminal positioning unit 72 as notification information. The terminal positional information may be included in a reference signal of the CH2 for notification, or may be included in a different signal and transmitted using the CH2. In a case where the terminal positional information is included in a signal different from a reference signal, the transmission timing control unit 60 controls the transmission timing so that the signal is transmitted simultaneously with the reference signals of the CH1 and the CH2 or within a certain allowable error time.

The signal including the positional information of the terminal device 70 is received by the base station device 20 together with the reference signal of the CH1 or the CH2. In the present embodiment, the information acquisition unit 40 of the base station device 20 has a function of acquiring terminal positional information from the signal. Then, the terminal positional information is transferred from the base station device 20 to the processing device 25.

In the learning phase, the processing device 25 includes the terminal positional information in the data set and stores the terminal positional information in the database unit 28. Then, the learning processing unit 30 generates a learning model using the terminal positional information as one element. Therefore, it is possible in the present embodiment to obtain a learning model based on the relationship among the state of the CH2, the position of the terminal device 70, the set value of the relay device 22, and the communication quality of the CH1.

In the estimation phase, the processing device 25 first acquires the position of the terminal device 70 in addition to the state of the CH2. Then, in the estimation processing unit 32, the processing device 25 estimates a set value of the relay device 22 that provides the CH1 with the best communication quality under the current position of the CH2 and the current position of the terminal device 70.

As described above, it is possible in the present embodiment to generate a learning model including the position of the terminal device 70. Then, the set value of the relay device 22 can be determined using the learning model in consideration of the position of the terminal device 70. Therefore, according to a wireless communication system of the present embodiment, the setting accuracy of the beam direction can be further enhanced and the communication efficiency can be enhanced as compared with the case of the first embodiment.

REFERENCE SIGNS LIST

20 Base station device
22, 62 Relay device
24, 70 Terminal device
25 Processing device
28 Database unit
30 Learning processing unit
32 Estimation processing unit
34, 52 CH1 transceiver unit
36, 54 CH2 transceiver unit
38 Quality acquisition unit
40 Information acquisition unit
44 Control signal generation unit
48 Weight setting unit
50 Reflector unit
56 CH1 reference signal generation unit
58 CH2 reference signal generation unit
60 Transmission timing control unit
72 Terminal positioning unit
74 Terminal information generation unit

The invention claimed is:

1. A wireless communication system comprising a base station, a relay, and a terminal, wherein the base station is configured to provide the relay with a control signal including a set value, the relay is configured to dynamically select a phase weight that determines a beam direction of a reflected wave according to the set value, the terminal is configured to transmit a reference signal having a low frequency and a reference signal having a high frequency, and the wireless communication system further includes a processor configured to execute, in a learning phase:

causing the base station to transmit the control signal toward the relay;

estimating, from the reference signal having the low frequency that has arrived at the base station, a state of a channel that transmits a signal having the low frequency;

measuring, from the reference signal having the high frequency that has arrived at the base station, communication quality at the high frequency;

storing a data set including a set value included in the control signal, the state of the channel, and the communication quality in a database; and learning a learning model that defines a relationship among the set value, the state of the channel, and the communication quality on a basis of a plurality of the data sets, and to execute, in an estimation phase:

estimating the latest state of the channel from the reference signal having the low frequency that has arrived at the base station;

applying the latest state to the learning model and estimating an optimum set value predicted to maximize the communication quality under the latest state; and causing the base station to transmit a control signal including the optimum set value.

2. The wireless communication system according to claim 1, wherein the state of the channel includes an arrival direction in which the reference signal having the low frequency arrives at the base station.

3. The wireless communication system according to claim 2, wherein the terminal is configured to further execute:

positioning a terminal position of the terminal itself; and transmitting a signal including information on the terminal position on a channel that handles the low frequency, the data set includes the terminal position in addition to the set value, the state of the channel, and the communication quality, the learning model defines a relationship among the set value, the state of the channel, the communication quality, and the terminal position, the processor is configured to further execute estimating the latest terminal position of the terminal from a signal having the low frequency that has arrived at the base station in the estimation phase, and the estimation of the optimum set value is executed by applying the latest terminal position to the learning model together with the latest state, and estimating an optimum set value predicted to maximize the communication quality under the latest state.

4. The wireless communication system according to claim 3, wherein the terminal is configured to transmit the reference signal having the low frequency and the reference signal having the high frequency in a manner such that a difference between transmission timing of the reference signal having the low frequency and transmission timing of the reference signal having the high frequency falls within an allowable range.

5. The wireless communication system according to claim 4, wherein the relay is an intelligent reflector having a reflector that reflects a signal having the high frequency between the base station and the terminal, or a smart repeater including a base station-side antenna for communicating with the base station, a user-side antenna for communicating with the terminal, and an amplifier that connects the base station-side antenna and the user-side antenna unit.

6. The wireless communication system according to claim 3, wherein the relay is an intelligent reflector having a reflector that reflects a signal having the high frequency between the base station and the terminal, or a smart repeater including a base station-side antenna for communicating with the base station, a user-side antenna for communicating with the terminal, and an amplifier that connects the base station-side antenna and the user-side antenna.

7. The wireless communication system according to claim 2, wherein the terminal is configured to transmit the reference signal having the low frequency and the reference signal having the high frequency in a manner such that a difference between transmission timing of the reference signal having the low frequency and transmission timing of the reference signal having the high frequency falls within an allowable range.

8. The wireless communication system according to claim 7, wherein the relay is an intelligent reflector having a reflector that reflects a signal having the high frequency between the base station and the terminal, or a smart repeater including a base station-side antenna for communicating with the base station, a user-side antenna for communicating with the terminal, and an amplifier that connects the base station-side antenna and the user-side antenna.

9. The wireless communication system according to claim 2, wherein the relay is an intelligent reflector having a reflector that reflects a signal having the high frequency between the base station and the terminal, or a smart repeater including a base station-side antenna for communicating with the base station, a user-side antenna for communicating with the terminal, and an amplifier that connects the base station-side antenna and the user-side antenna.

10. The wireless communication system according to claim 1, wherein the terminal is configured to further execute:

positioning a terminal position of the terminal itself; and transmitting a signal including information on the terminal position on a channel that handles the low frequency, the data set includes the terminal position in addition to the set value, the state of the channel, and the communication quality, the learning model defines a relationship among the set value, the state of the channel, the communication quality, and the terminal position, the processor is configured to further execute estimating the latest terminal position of the terminal from a signal having the low frequency that has arrived at the base station in the estimation phase, and the estimation of the optimum set value is executed by applying the latest terminal position to the learning model together with the latest state, and estimating an optimum set value predicted to maximize the communication quality under the latest state.

11. The wireless communication system according to claim 10, wherein the terminal is configured to transmit the reference signal having the low frequency and the reference signal having the high frequency in a manner such that a difference between transmission timing of the reference signal having the low frequency and transmission timing of the reference signal having the high frequency falls within an allowable range.

12. The wireless communication system according to claim 11, wherein the relay is an intelligent reflector having a reflector that reflects a signal having the high frequency between the base station and the terminal, or a smart repeater including a base station-side antenna for communicating with the base station, a user-side antenna for communicating with the terminal, and an amplifier that connects the base station-side antenna and the user-side antenna.

13. The wireless communication system according to claim 10, wherein the relay is an intelligent reflector having a reflector that reflects a signal having the high frequency between the base station and the terminal, or a smart repeater including a base station-side antenna for communicating with the base station, a user-side antenna for communicating with the terminal, and an amplifier that connects the base station-side antenna and the user-side antenna.

14. The wireless communication system according to claim 1, wherein the terminal device is configured to transmit the reference signal having the low frequency and the reference signal having the high frequency in a manner such that a difference between transmission timing of the reference signal having the low frequency and transmission timing of the reference signal having the high frequency falls within an allowable range.

15. The wireless communication system according to claim 14, wherein the relay is an intelligent reflector having a reflector that reflects a signal having the high frequency between the base station and the terminal, or a smart repeater including a base station-side antenna for communicating with the base station, a user-side antenna for communicating with the terminal, and an amplifier that connects the base station-side antenna and the user-side antenna.

16. The wireless communication system according to claim 1, wherein the relay is an intelligent reflector having a reflector that reflects a signal having the high frequency between the base station and the terminal, or a smart repeater including a base station-side antenna for communicating with the base station, a user-side antenna for communicating with the terminal, and an amplifier that connects the base station-side antenna and the user-side antenna.

17. A wireless communication method for realizing wireless communication that uses a base station, a relay, and a terminal, the wireless communication method comprising:

providing, by the base station, the relay with a control signal including a set value;

dynamically selecting, by the relay, a phase weight that determines a beam direction of a reflected wave according to the set value; and transmitting, by the terminal, a reference signal having a low frequency and a reference signal having a high frequency, the wireless communication method further comprising, in a learning phase:

causing the base station to transmit the control signal toward the relay;

estimating, from the reference signal having the low frequency that has arrived at the base station, a state of a channel that transmits a signal having the low frequency;

measuring, from the reference signal having the high frequency that has arrived at the base station, communication quality at the high frequency;

storing a data set including a set value included in the control signal, the state of the channel, and the communication quality in a database; and learning a learning model that defines a relationship among the set value, the state of the channel, and the communication quality on a basis of a plurality of the data sets, the wireless communication method further comprising, in an estimation phase:

estimating the latest state of the channel from the reference signal having the low frequency that has arrived at the base station;

applying the latest state to the learning model and estimating an optimum set value predicted to maximize the communication quality under the latest state; and causing the base station to transmit a control signal including the optimum set value.

18. A wireless communication processing device for realizing wireless communication using a base station configured to transmit a control signal including a set value, a relay configured to receive the control signal and dynamically select a phase weight that determines a beam direction of a reflected wave according to the set value, and a terminal configured to transmit a reference signal having a low frequency and a reference signal having a high frequency, the wireless communication processing device being configured to execute, in a learning phase:

causing the base station to transmit the control signal toward the relay;

estimating, from the reference signal having the low frequency that has arrived at the base station, a state of a channel that transmits a signal having the low frequency;

measuring, from the reference signal having the high frequency that has arrived at the base station, communication quality at the high frequency;

storing a data set including a set value included in the control signal, the state of the channel, and the communication quality in a database; and learning a learning model that defines a relationship among the set value, the state of the channel, and the communication quality on a basis of a plurality of the data sets, and to execute, in an estimation phase:

estimating the latest state of the channel from the reference signal having the low frequency that has arrived at the base station;

applying the latest state to the learning model and estimating an optimum set value predicted to maximize the communication quality under the latest state; and causing the base station to transmit a control signal including the optimum set value.

19. A computer readable non-transitory storage medium storing a wireless communication processing program for realizing wireless communication using a base station configured to transmit a control signal including a set value, a relay configured to receive the control signal and dynamically select a phase weight that determines a beam direction of a reflected wave according to the set value, and a terminal configured to transmit a reference signal having a low frequency and a reference signal having a high frequency, the wireless communication processing program being capable of causing an arithmetic processor to execute, in a learning phase:

causing the base station to transmit the control signal toward the relay;

estimating, from the reference signal having the low frequency that has arrived at the base station, a state of a channel that transmits a signal having the low frequency;

measuring, from the reference signal having the high frequency that has arrived at the base station, communication quality at the high frequency;

storing a data set including a set value included in the control signal, the state of the channel, and the communication quality in a database; and learning a learning model that defines a relationship among the set value, the state of the channel, and the communication quality on a basis of a plurality of the data sets, and to execute, in an estimation phase:

estimating the latest state of the channel from the reference signal having the low frequency that has arrived at the base station;

applying the latest state to the learning model and estimating an optimum set value predicted to maximize the communication quality under the latest state; and causing the base station to transmit a control signal including the optimum set value.

* * * * *